M. PICARD.
MEASURING INSTRUMENT.
APPLICATION FILED OCT. 29, 1908.
931,475.
Patented Aug. 17, 1909.
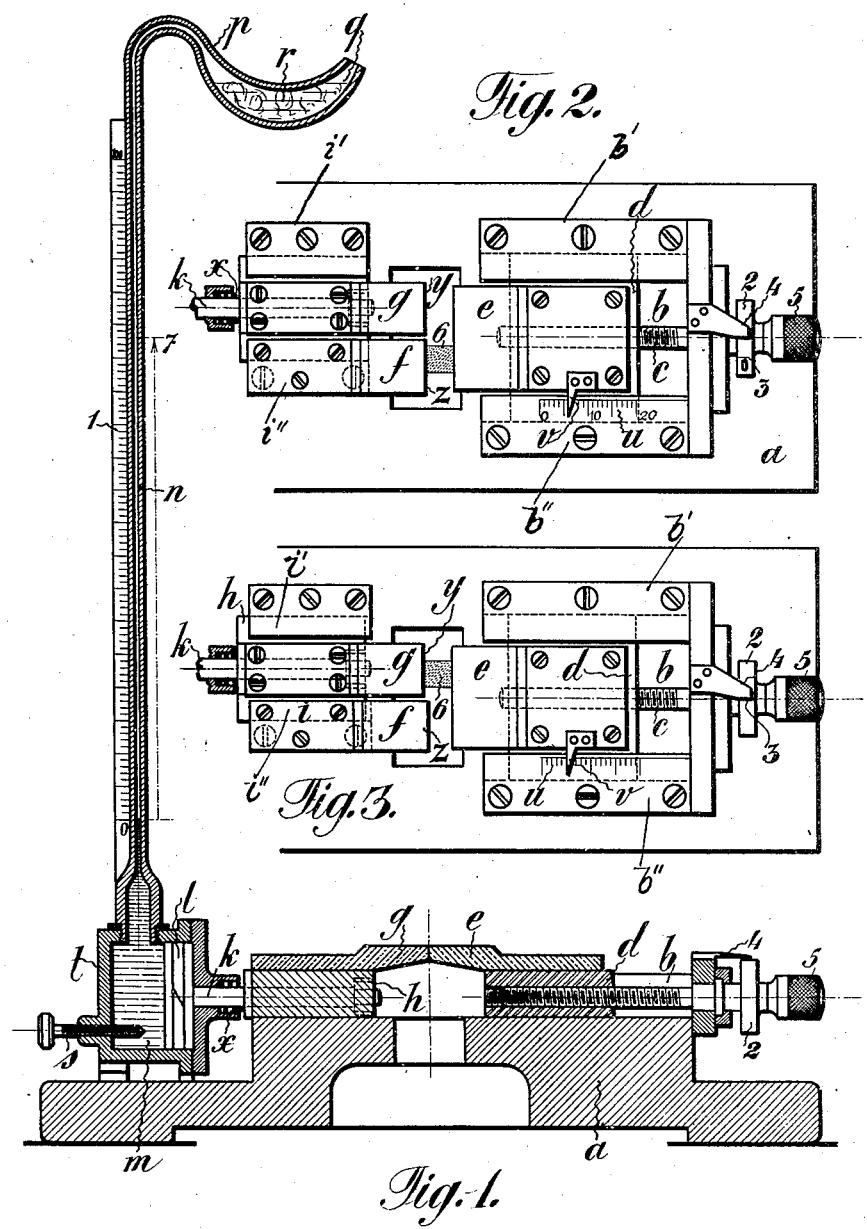
WITNESSES,
INVENTOR,
MAURICE PICARD,
by
ATTORNEY.

US UNITED STATES PATENT OFFICE.

MAURICE PICARD, OF PARIS, FRANCE.

MEASURING INSTRUMENT.

No. 931,475.

Specification of Letters Patent.

Patented Aug. 17, 1909.

Application filed October 29, 1908. Serial No. 460,106.

*To all whom it may concern:*

Be it known that I, MAURICE PICARD, a citizen of France, and resident of Paris, in the Department of the Seine, France, have invented a certain new and useful Measuring Instrument, of which the following is a specification.

This invention relates to a measuring instrument of great precision comprising three stops one of which may be moved by any suitable device relative to the other two, one of these latter being fixed while the other, which may be moved in a direction parallel to the first, is solid with a piston movable in a cylinder containing a liquid and communicating with a tube whose internal diameter is considerably smaller than the diameter of the said piston, in such a manner that a very slight movement of the piston or of its solid stop, causes a considerable displacement of the liquid in the said tube.

The annexed drawing shows one embodiment of the invention in vertical section in Figure 1. Fig. 2 is a part plan of the instrument. Fig. 3 is a like view to Fig. 2 in which certain members are shown in a different position.

As shown, the instrument comprises a rigid frame $a$ having a slide-way $b$ formed by the cleats $b'$ $b''$ in which may be moved, under the action of a micrometric screw $c$, a sliding block $d$ carrying a measuring stop $e$, located opposite two other stops: one stop $f$ is fixed to the frame while the other $g$ can move, in a direction parallel to the stop $e$, with a sliding block $h$ mounted in a slide-way $i$, formed by the cleats $i'$ $i''$ and connected, by means of a rod $k$, with a piston $l$ (Fig. 1) housed in a cylinder $m$ communicating with a glass tube $n$, arranged vertically in the form of a barometric column whose internal diameter bears a fixed ratio to that of the cylinder $m$, this cylinder and the tube $n$ being filled up to the zero point $o$, with liquid, the piston being then at the outer limit of its movement, and the edges of the stops $f$ and $g$ being flush with each other. Under these conditions longitudinal displacement of 1 mm. of the piston $l$ in the cylinder causes the liquid in the tube $n$ to rise to 100 mm. above zero.

The tube $n$ has, at its upper end, a bent part $p$ forming a chamber $q$ containing a piece of cotton $r$ impregnated with a substance for absorbing moisture, so that air entering the tube will be as dry as possible. This condition is particularly necessary in the case where the liquid filling the cylinder $m$ is mercury. A scale 1 is disposed behind the tube $n$ as shown.

A screw $s$, screwed into the wall $t$ of the cylinder permits, by penetrating more or less into the cylinder, of regulating the level of the liquid in the tube $m$ so that this level will always be at the zero point of the tube before making a measurement.

On the edge of the slideway $b$ is a millimetric scale $u$ and an index pointer $v$ is fixed on the sliding block carrying the stop $e$, so that this index is at the zero point of said scale when the stop $e$ is in contact with the fixed stop $f$.

A spring $x$ tends to maintain constantly the stop $g$ in exactly the same relative position as the stop $f$, that is to say, when no measurement is made, or when the article to be measured is placed between the stops $e$ and $f$, the face $y$ of the stop $g$ is exactly in alinement with the face $z$ of the stop $f$. In this position the level of the liquid in the tube $n$ will be exactly at zero.

The screw $c$, which has a pitch of one millimeter, is operated by a head 5 having a score 3 which must register exactly with a fixed index 4 when the two stops $f$, $g$ are in contact with $e$ and when the index $v$ is at zero on the scale $u$.

To prevent the micrometric screw $c$ from being jammed it is operated by a milled head 5 actuating an internal device working with easy friction or a ratchet device, not shown on the drawing: this device may be one of the known types generally used in micrometers and calipers.

The operation of the instrument is as follows:—Suppose for example, the width of a piece 6 (Figs. 2 and 3) is to be measured: by means of the milled head 5 and screw $c$ the stop $e$ is moved away from the stop $f$ until the piece 6 passes freely between the two stops; then the stop $e$ is brought nearer $f$ by means of the milled head 5 until this turns without moving the screw $c$: it can then be seen on the scale $u$ that the index $v$ has passed 5 mm. and that the score 3 on the disk 2 does not register with the index 4. The piece 6 is then placed between the stops $e$ and $g$ and the screw $c$ is turned until the index $v$ points to 5 mm. on the scale $u$ and the score 3 of the button 2 registers with the index 4 (Fig. 3): the stop $g$ will have been retracted for the difference between 5 mm. and the fraction of a millimeter by which the piece 6 is supposed to exceed 5 mm. This backward movement will have caused the liquid to rise in the tube $n$ from 0 to 7 (Fig. 1) and 73/100 is read on the scale $i$. The piece 6 is therefore 5.73 mm. in thickness.

It will be understood that with a longer tube $n$ and a ratio between the internal diameter of this tube and the diameter of the piston $l$ larger than in the example which has been described, it will be possible to obtain a greater precision reaching up to 1/1000 or even to 1/10000 of a millimeter.

The form and the dimensions of the different members of this instrument may vary.

The tube the level of the liquid in which indicates the fractions of the unit of measure on which the scale $u$ is based need not necessarily be vertical.

Having now described my invention, I claim as new and wish to secure by Letters Patent:—

In a micrometer, a movable stop actuated by a micrometer screw, and carrying a pointer moving on a scale attached to the slide-way of the movable stop, in combination with a pair of measuring stops, one fixed, the other movable, the movable member being integral with and actuating a piston, said piston acting upon a liquid inclosed in a cylinder provided with a narrow communicating tube whose internal bore bears a fixed ratio to the cubic capacity of the cylinder, the said tube carrying a scale adapted to coördinate the displacement of the liquid with the displacement of the movable stop connected to the piston, substantially as set forth.

In testimony whereof, I have signed my name to this specification in the presence of two subscribing witnesses.

MAURICE PICARD.

Witnesses:
  HANSON C. COXE,
  JOHN BAKER.